W. C. STEVENS.
QUICK ACTING CHUCK.
APPLICATION FILED DEC. 4, 1916.
1,256,841.
Patented Feb. 19, 1918.
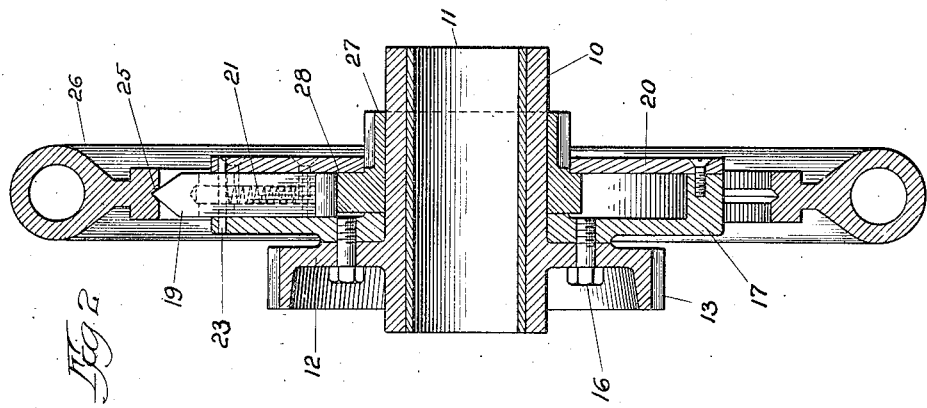
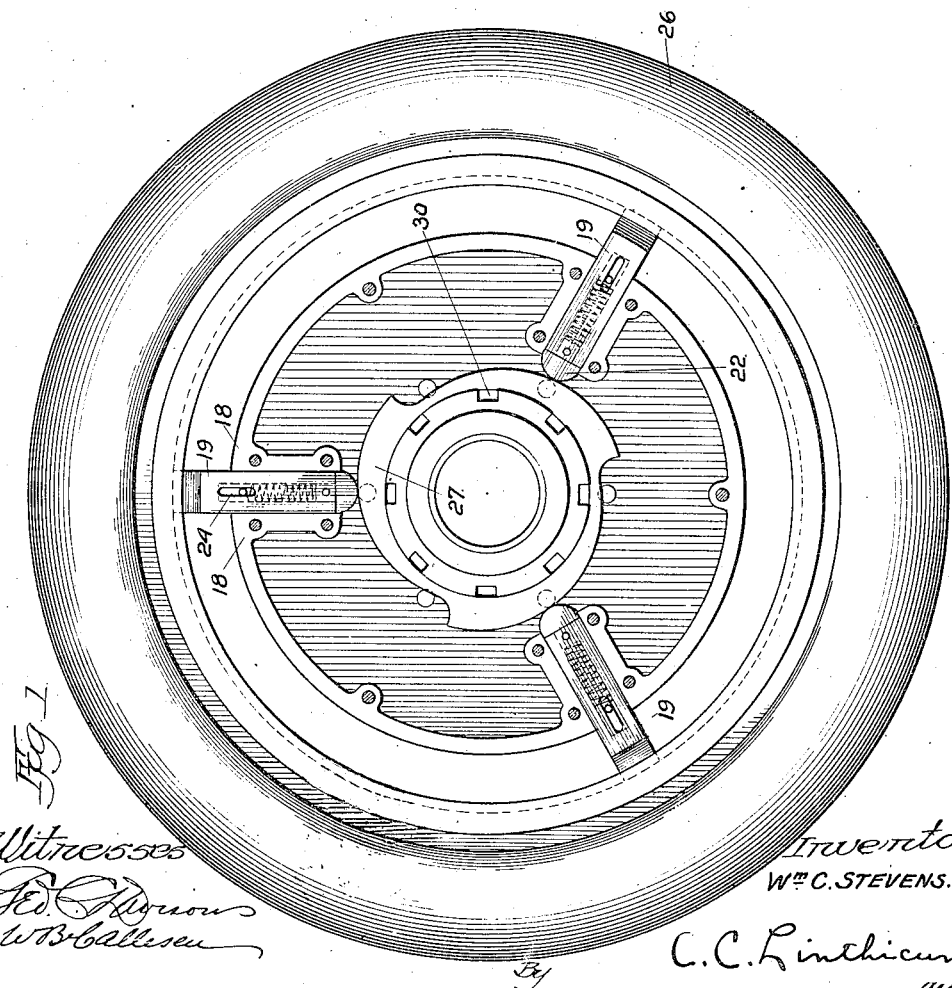

UNITED STATES PATENT OFFICE.

WILLIAM C. STEVENS, OF SUMMIT COUNTY, OHIO, ASSIGNOR TO THE FIRESTONE TIRE & RUBBER COMPANY, OF AKRON, OHIO, A CORPORATION OF OHIO.

QUICK-ACTING CHUCK.

1,256,841.  Specification of Letters Patent.  Patented Feb. 19, 1918.

Application filed December 4, 1916. Serial No. 134,860.

*To all whom it may concern:*

Be it known that I, WILLIAM C. STEVENS, a citizen of the United States, residing in the county of Summit and State of Ohio, have invented certain new and useful Improvements in Quick-Acting Chucks, of which the following is the specification.

This invention relates particularly to chucks adapted to be carried by tire making machines used in the manufacture of fabric automobile tires, and which is adapted to hold the ring core upon which the tire is built. The construction is, of course, useful in other industries, but it is particularly designed for the class of work described. Chucks of this general type have been known heretofore and have been used extensively, but they have been, as a general rule, awkward to operate and have taken considerable time. To replace these chucks I have devised the construction shown herein, which is especially adapted for quick work requiring but a fraction of a turn of a lever or other tool to securely fasten or free the ring core.

Although I have shown one form of chuck, it is obvious that the invention may be embodied in forms other than shown in the drawing in which like reference numerals refer to like parts, and in which:

Figure 1, is a front elevation of my improved chuck with a core mounted thereon, and Fig. 2, is a cross section through the center of the chuck and core.

My improved form of chuck comprises a sleeve 10 in the center of which is a boring 11 adapted to fit over the central shaft of a t re making machine of any well known type. In the rear of the sleeve 10 is formed an integral web 12 around the outer edge of which is formed a series of gear teeth 13, by which the chuck or spider may be driven, as will be understood by those skilled in the art.

Secured to the web 12 by means of a series of bolts 16 is the body of the chuck 17, which is arranged to fit over the portion 10 of the chuck, and serves as a guiding or bearing plate for the radially extended arms, as will be described later. Around the body 17 of the chuck are formed any suitable number of radial guideways 18 shown as 3, in which are slidingly mounted the expanding arms 19. An annular face plate 20 is secured to the front of the chuck body and serves to hold the sliding arms 19 in place.

Each arm 19 is bored longitudinally and in each bore is placed a coil spring 21, the lower end of which rests on the stem of a pin 22 which closes the lower end of the bore and forms a bearing surface. The upper end of the spring is attached to a pin 23, which is held in the body 17 of the chuck, passes through a slot 24 in each side of the arm 19 and is secured on the other side in the face plate 21 of the chuck. By this construction it will be seen that the spring constantly urges the arm 19 inwardly toward the chuck. The upper end of each arm 19 is brought to a taper which is received in a groove 25 on the inside of the ring core. By this construction it may be seen that when the arms are at the outward limit of their movement the core will be firmly clasped and centered relative to the chuck and to the shaft of the machine.

In order to move the arms radially to effect a clamping of the core or its release there is arranged on the sleeve 10 a cam plate 27, which is arranged so that it may be located on the hub 10. The edge of the cam plate is formed with a number of cam surfaces 28 equal in number to the arms 19. The lower ends 22 of these arms rest on the edges of the cam plate and are held in this position by the springs 21. Formed integrally with the cam plate 27 is a sleeve 29 extended forwardly from the main body of the cam plate, the outer edge of the sleeve being formed with a series of grooves or teeth 30 which are intended to be clasped by a spanner wrench of any desired type.

It is believed that the operation of the improved chuck will be readily understood from this description. It being desired to secure a core on the chuck and the cam plate 27 being in a position in which the arms 19 will be at the inward limit of their travel, the core is placed over the chuck and allowed to hang from the upper arm or arms 19. The spanner wrench is then placed over the extension 30 of the cam plate and with a short turn the cams are rotated so that the arms 19 will all be forced outwardly to a position firmly holding the core in position.

It is obvious that various changes and modifications will be made in the structure shown without departing from the spirit of the invention or sacrificing any of its benefits.

Claim:

A chuck for holding and rotating tire cores, comprising a hub, a driving formation on one side of the hub, a chuck body secured to the hub adjacent the driving formation, radial guideways on the chuck body, arms slidably mounted in the guideways, springs to force the arms inwardly, bearing surfaces on the inner ends of said arms, a cam body rotatably mounted on said hub, cam surfaces equal in number to the arms on the cam body, the bearing surface of each arm resting on a cam surface, a sleeve on said cam body concentric with said hub and extending in a direction opposite to said driving formation, and means on said sleeve to rotate the cam body.

WILLIAM C. STEVENS.